(12) United States Patent
Gu et al.

(10) Patent No.: US 8,723,960 B2
(45) Date of Patent: May 13, 2014

(54) METHOD FOR MEASURING VIDEO QUALITY USING A REFERENCE, AND APPARATUS FOR MEASURING VIDEO QUALITY USING A REFERENCE

(75) Inventors: Xiaodong Gu, Beijing (CN); Debing Liu, Beijing (CN); Feng Xu, Beijing (CN); Zhibo Chen, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/807,875

(22) PCT Filed: Jul. 2, 2010

(86) PCT No.: PCT/CN2010/000998
§ 371 (c)(1),
(2), (4) Date: Dec. 31, 2012

(87) PCT Pub. No.: WO2012/000136
PCT Pub. Date: Jan. 5, 2012

(65) Prior Publication Data
US 2013/0100350 A1 Apr. 25, 2013

(51) Int. Cl.
*H04N 17/00* (2006.01)
(52) U.S. Cl.
USPC ............................................. 348/180
(58) Field of Classification Search
None
See application file for complete search history.

(56) References Cited

U.S. PATENT DOCUMENTS

2010/0026813 A1* 2/2010 Hamada et al. ............... 348/180
2010/0199300 A1 8/2010 Meur et al.

FOREIGN PATENT DOCUMENTS

| CN | 1477853 | 2/2004 |
| CN | 101714155 | 5/2010 |
| EP | 1387343 | 3/2009 |

OTHER PUBLICATIONS

Ninassi et al., "Considering Temporal Variations of Spatial Visual Distortions in Video Quality Assessment", IEEE Journal of Selected Topics in Signal Processing, vol. 3, Issue 2, Apr. 2009, pp. 253-265.

* cited by examiner

*Primary Examiner* — Jeffery Harold
*Assistant Examiner* — Samira Monshi
(74) *Attorney, Agent, or Firm* — Tutunjian & Bitetto, P.C.

(57) ABSTRACT

The purpose of an objective video quality evaluation is to automatically assess the quality of video sequences in agreement with human quality perception. The invention addresses the effects of the introduction of a temporal dimension by focusing on the temporal evolutions of spatial distortions, since it has been found that a spatial quality variation cannot be evaluated by simple subtraction of the spatial quality of neighboring frames. An improved method for estimating perceived video quality comprises steps of calculating a first similarity map between adjacent frames of a current sequence, calculating a second similarity map between the corresponding reference frames, and calculating (smg3) a third similarity map, which provides a numerical quality value.

11 Claims, 5 Drawing Sheets c)  sm1 d)  sm2

METHOD FOR MEASURING VIDEO QUALITY USING A REFERENCE, AND APPARATUS FOR MEASURING VIDEO QUALITY USING A REFERENCE

This application claims the benefit, under 35 U.S.C. §365 of International Application PCT/CN2010/000998, filed Jul. 2, 2010, which was published in accordance with PCT Article 21 (2) on Jan. 5, 2010 in English.

FIELD OF THE INVENTION

This invention relates to a method for measuring video quality of a sequence of distorted video pictures, in cases where the reference pictures are available. Further, the invention relates to a corresponding apparatus.

BACKGROUND

The purpose of an objective video quality evaluation is to automatically assess the quality of video sequences in agreement with human quality judgements or perception. Over the past few decades, video quality assessment has been extensively studied and many different objective criteria have been set.

The effects of the introduction of the temporal dimension in a quality assessment context need to be addressed in a different way. A major consequence of the temporal dimension is the introduction of temporal effects in the distortions such as flickering, jerkiness and mosquito noise. Generally, a temporal distortion can be defined as the temporal evolution or fluctuation of the spatial distortion on a particular area which corresponds to the image of a specific object in the scene. Perception over time of spatial distortions can be largely modified (enhanced or attenuated) by their temporal changes. The time frequency and the speed of the spatial distortion variations, for instance, can considerably influence human perception.

The inventors addressed the effects of the introduction of a temporal dimension, by focusing on the temporal evolutions of spatial distortions.

In the prior art[1], a perceptual full reference video quality assessment metric was designed that took into account the temporal evolutions of the spatial distortion. As the perception of the temporal distortions is closely linked to the visual attention mechanisms, the prior art chose to first evaluate the temporal distortion at eye fixation level. In this short-term temporal pooling, the video sequence is divided into spatio-temporal segments in which the spatio-temporal distortions are evaluated, resulting in spatio-temporal distortion maps. Afterwards, the global quality score of the whole video sequence is obtained by the long-term temporal pooling in which the spatio-temporal maps are spatially and temporally pooled. However, the prior work in the area of temporal quality evaluation has a number of disadvantages, for example it cannot well be handled in the following cases:

1) The spatio-temporal segments are composed by tracking a block in more than 20 continuous frames with the help of motion vectors. This is usually not practical, since motion vectors currently are very different from true motion, particularly if errors accumulate over such long sequence.
2) In the scheme, a total of six constant numbers are introduced, whose values are defined by user selection of values which make the scheme's prediction accuracy higher according to the respective dataset (composed by 30 sequences). It is clear that the dataset is not sufficiently large to support the selection of six constant numbers and finally the evaluation of the scheme performance.

[1] A. Ninassi, O. Le. Meur, P. L. Callet and D. Barba, "Considering temporal variations of spatial visual distortions in video quality assessment", IEEE JSTSP, Special issue on visual media quality assessment This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

SUMMARY OF THE INVENTION

It has been found that a spatial quality variation cannot be evaluated by simple subtraction of the spatial quality of neighbouring frames.

In view of the above, a problem to be solved by the present invention is how to identify an additional perceptual quality decrease that is caused by spatial quality variation.

The present invention provides a method for estimating video quality at any position of the video sequence, while considering the perceptual quality decrease caused by temporal variation of spatial qualities. In principle, a process of the proposed improved method is:

Step 1: Calculate the similarity map $\overrightarrow{CM}(f,f')$ of the current frame of the video sequence;

Step 2: Calculate the similarity map $\overrightarrow{CM}(f_0, f'_0)$ of the corresponding frame in the source video sequence; and Step 3: Calculate $VQM_{variation}$, which is the objective estimation according to the equation given in this section.

According to one aspect of the invention, a method for measuring video quality of a sequence of distorted video pictures, wherein the respective video pictures are also available as undistorted video pictures, comprises steps of dividing the pictures into blocks of equal size, generating a first similarity map, wherein the blocks of a distorted picture f and the corresponding collocated blocks of a temporally neighbouring distorted picture f' are input to a first similarity function that outputs a first similarity map, generating a second similarity map, wherein the blocks of an undistorted picture $f_0$ and the corresponding collocated blocks of a temporally neighbouring undistorted picture $f'_0$ are input to the first similarity function that outputs a second similarity map, calculating the similarity between the first similarity map and the second similarity map, wherein a second similarity function is used and wherein a single numerical value is obtained, and providing said single numerical value as a measure for the video quality of said sequence of distorted video pictures.

According to another aspect of the invention, an apparatus for measuring video quality of a sequence of distorted video pictures, wherein the respective video pictures are also available as undistorted video pictures, comprises picture dividing means for dividing the pictures into blocks of equal size, first similarity map generating means for generating a first similarity map, wherein the blocks of a distorted picture f and the corresponding collocated blocks of a temporally neighbouring distorted picture f' are input to a first similarity function $f_{sim,1}(f,f')=\overrightarrow{CM}(f,f')$ that outputs a first similarity map, second similarity map generating means for generating a second similarity map, wherein the blocks of an undistorted picture $f_0$ and the corresponding collocated blocks of a temporally neighbouring undistorted picture $f'_0$ are input to the first similarity function $f_{sim,1}(f_0,f'_0) = \overrightarrow{CM}(f,f')$ that outputs a second similarity map, third similarity map generating means for calculating a similarity between the first similarity map and the second similarity map, wherein a second similarity function $f_{sim,2}(X, Y)$ is used, and wherein a single numerical value (VQM) is obtained; and output means for providing said single numerical value as a measure for the video quality of said sequence of distorted video pictures.

In one embodiment, the second similarity function operates according to $VQM_{variation} = f_{sim}^2(\overrightarrow{CM}(f,f'), \overrightarrow{CM}(f_0,f'_0))$.

Note that that $f_{sim,1}$ and $f^1_{sim}$ are used as equivalents herein. Likewise, $f_{sim,2}$ and $f^2_{sim}$ denote the same term.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 PSNR variation in a decoded video sequence.

DETAILED DESCRIPTION OF THE INVENTION

Figure 1:
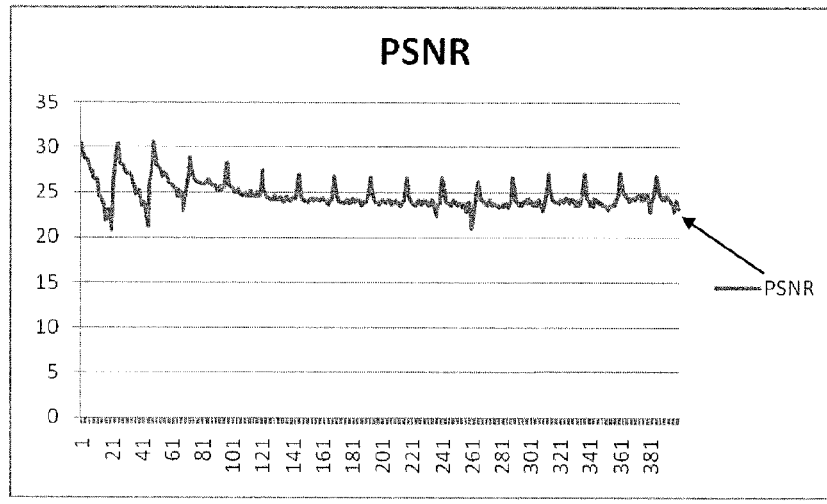

In a typical video sequence encoded with constant QP (quantization parameter) and IPPP . . . structure, the spatial quality of the frames in the decoded sequence are usually not uniform, as depicted in FIG. 1. Usually the first I-frame of the GOP is of highest spatial quality, and the spatial quality decreases when the distance between the frame and the first I-frame of the GOP becomes larger. From this example, we see that the spatial quality of the frames of a video sequence is not uniform; sometimes the difference is visible. However, we usually do not notice any discomfort when browsing these videos, just as if the spatial quality kept uniform along time. And there are some other cases with similar PSNR variation, for which viewers will notice clear frame flash or snow-noisy effect because of spatial quality variations.

There is a problem of identifying, determining and/or measuring the additional perceptual quality decrease that is caused by spatial quality variation. In a simple approach, the spatial quality variation can be evaluated by the subtraction of the spatial quality of neighbouring frames. But the below example shows that this is not sufficient.

TABLE 1

| Different frame types | | | |
|---|---|---|---|
| Frame type 1 | | | |
| 1 | 0 | 1 | 0 |
| 0 | 1 | 0 | 1 |

TABLE 1-continued

| Different frame types | | | |
|---|---|---|---|
| 1 | 0 | 1 | 0 |
| 0 | 1 | 0 | 1 |
| Frame type 2 | | | |
| 0 | 1 | 0 | 1 |
| 1 | 0 | 1 | 0 |
| 0 | 1 | 0 | 1 |
| 1 | 0 | 1 | 0 |

As shown in Tab.1, the frames are divided into blocks. Each cell represents a block of the frame. The number in the cell has the following meaning: "0" means no quality decrease introduced in the block, i.e. the block is simply copied from the source frame; "1" means a certain level (i.e. a constant number) of distortion (e.g. blur) is introduced into the block. The frames of frame type 1 and those of frame type 2 are of same spatial quality in an average view, since the portion of undistorted blocks is the same. But a difference becomes clear when considering the next two sequences:

Video 1: all odd indexed frames are of frame type 1, all even indexed frames are of frame type 2;

Video 2: all frames are of frame type 1.

Clearly, all frames in video 1 and video 2 are of same spatial quality on average. However, there are additional temporal distortions in video 1: the viewer can observe a clear flash, since in every spatial location the video content switches between high quality and low quality. This is different in video 2.

Thus, the conclusion is that the quality variation cannot be simply evaluated by a subtraction of the spatial quality of neighbouring frames.

Now, some terms are defined which will be used herein.

Spatial quality: in video quality measurement, sometimes only the quality of each image of the video sequence is considered, and the average quality for all images is supposed to be the quality of the video. Since temporal features are not considered in this case, the so estimated video quality is called "spatial quality". Correspondingly, the traditional image distortion types, such as blockiness, blur, noise etc., are called spatial distortion.

Temporal quality: in video browsing, viewer perception will not only be influenced by the quality of each image (spatial quality), but also the fluency and naturalness in temporal axis of the video displaying. This kind of quality in temporal axis is called temporal quality. Respective distortion is called temporal distortion.

Temporal quality variation/Temporal variation: temporal variation is a kind of temporal distortion. Sometimes, viewers consider that the video sequence is not displayed in a uniform spatial quality. As a result, they observe that a part of the video content flashes because it switches temporally between good quality and bad quality. This kind of temporal distortion is called temporal (quality) variation, which is a key aspect in this invention.

The following two basic human vision properties are widely acknowledged:

First, human perception is closely linked to the visual attention mechanisms.

Second, viewer attention will be easier captured by an object which is outstanding and appears unnatural in its neighbouring area.

If a block of the current frame (compared to the previous frame) changes unnaturally, this unnatural change will easily capture a viewer's attention. And if the viewer does not like this change, viewer perception is then decreased. This is generally the case for all kinds of differences between a natural view and a picture view, e.g. due to low resolution, blur, data errors etc.

To manage this kind of changes according to the present invention, both the current frame and the previous frame are taken into consideration.

Denote the current frame f and the previous frame f'. In traditional video quality measurement that considers only spatial quality, the quality of f is measured separately, without the presence of f'. According to the above mentioned sample, the invention takes into account both f and f' in measuring quality variation. Denote $f_0$ and $f'_0$ the un-distorted (source) version of frame f and f'.

According to the above analysis, the traditional spatial quality measurement can be described as a function of $VQM_{Spatial}(f,f_0)$. In evaluating temporal quality variation, the measurement according to the invention uses the function of $VQM_{Variation}(<f',f>,<f'_0,f_0>)$. The invention issues an effective measurement function for the evaluation of temporal quality variation.

Below is a description of monitoring video quality variation by evaluating structure changes. In the following, we define $$f_{sim}^1(X,Y), f_{sim}^2(X,Y) \quad (1)$$

as two functions to measure the similarity of two non-negative signals X and Y. According to human vision properties, a viewer's attention will be easier captured by an object which is outstanding and unnatural in its neighboring area. In a temporal axis, this "outstanding and unnatural" is expressed by a change or difference (opposite of similarity) between adjacent frames.

Therefore, a "similarity map" of a frame f as compared to its previous frame can be obtained as follows:

Step 1: Frames are divided into equal size blocks, e.g. blocks of size 16×16 pixels;
Step 2: For each block $b_i$ of frame f, denote $b'_i$ the corresponding block of frame f' that is at the same spatial position as $b_i$ of frame f. I.e., $b_i$ and $b'_i$ are collocated.
Step 3: Calculate the similarity according to $f_{sim}^1(b_i, b'_i)$. The value of $f_{sim}^1(b_i, b'_i)$ for all blocks composes the similarity map of the frame f. The similarity map is denoted as $\overrightarrow{CM}(f,f')$.

A remaining step, according to the invention, is to check whether the similarity map of f is "natural" and will not decrease viewing perception. As it is very expensive to model the naturalness of natural video, an approximate solution can be used.

Since source video is supposed to be natural video, it is supposed that the similarity maps of source video frames are good examples for "naturalness". The more similar the similarity map of distorted video frames to the similarity map of corresponding source video frames, the more natural will the distorted video appear, and the less perceptual quality decrease is introduced by temporal variation.

According to the invention, the video quality at a frame f considering only quality decrease caused by temporal variation $VQM_{Variation}$ is defined as the similarity of the similarity map of frame f (i.e. $\overrightarrow{CM}(f,f')$) and the corresponding similarity map of frame $f_0$ (i.e. $\overrightarrow{CM}(f,f')$) in the source video:

$$VQM_{variation} = f_{sim}^2(\overrightarrow{CM}(f,f'), \overrightarrow{CM}(f_0,f'_0)) \quad (2)$$

In this process, we adopt the similarity measurement twice:
In the construction of a similarity map, we try to catch the structure change between the two adjacent frames. In one embodiment, we use Pearson Correlation, which is a measure of structural similarity: $(X=\{x_1,x_2,\ldots,x_n\}, Y=\{y_1,y_2,\ldots,y_n\}$, wherein $\overline{X}$ and $\overline{Y}$ are the average of the signals, and $\sigma_X$ and $\sigma_Y$ are the standard deviation of the signals. The Pearson Correlation is defined as $$f_{sim}^1(X,Y) = PearsonCorrelation(X,Y) \quad (3)$$
$$= \frac{\sum_{i=1}^n (x_i - \overline{X})(y_i - \overline{Y})}{(n-1)\sigma_X \sigma_Y}$$

In the evaluation of temporal quality variation $VQM_{variation}$, the similarity measurement is adopted mainly to measure the difference of the two similarity map. Therefore, we define $$f_{sim}^2(X,Y) = \frac{\sum_{i=1}^n |x_i - y_i|}{n} \quad (4)$$

In one aspect, the invention provides a method to estimate video quality at any position of the video sequence, considering the perceptual decrease caused by temporal variation of spatial qualities. A process of the proposed method is:

Step 1: Calculate the similarity map $\overrightarrow{CM}(f,f')$ of the current frame of the video sequence;
Step 2: Calculate the similarity map $\overrightarrow{CM}(f_0,f'_0)$ of the corresponding frame in the source video sequence;
Step 3: Calculate $VQM_{variation}$, which is the estimation value according to the equation given above.

In the following section, an empirical evaluation of the proposed method is described.

A video database is used that is built from six unimpaired video sequences of various contents. The spatial resolution of the video sequences is 720×480 with a frequency of 50 Hz in a progressive scan mode. Each clip lasts 8 seconds. The clips are displayed at a viewing distance of four times the height of the picture (66 cm). These video sequences have been degraded by using a H.264/AVC compression scheme at five different bitrates, resulting in thirty impaired video sequences. The five different bitrates were chosen in order to generate degradations all over the distortion scale (from "imperceptible" to "very annoying"). The impairments produced by the encoding are evidently neither spatially nor temporally uniform, and therefore depend on the video content.

Figure 2:
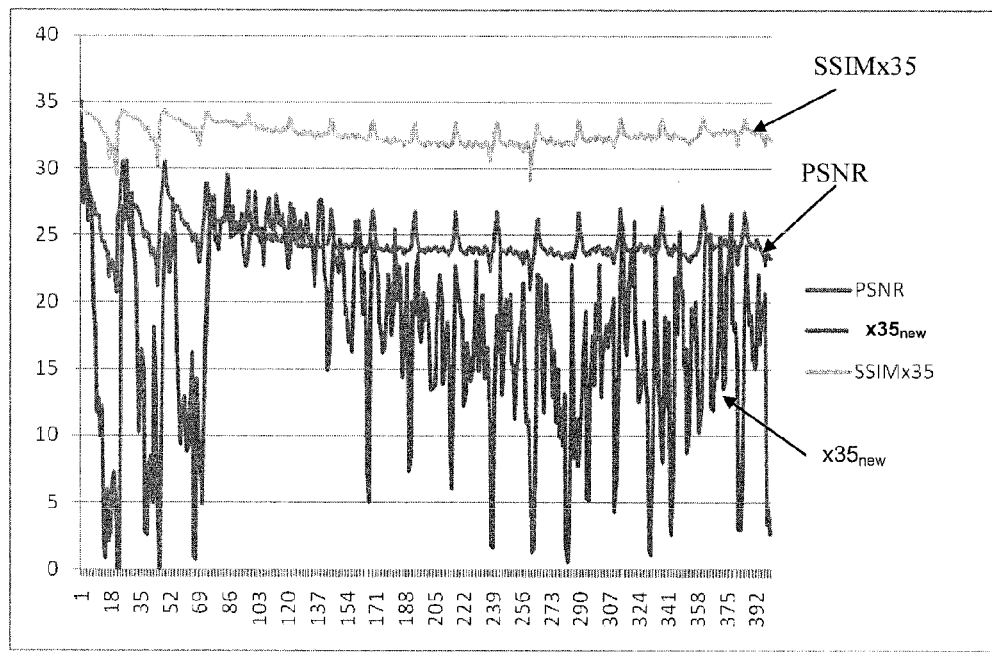
FIG. 2 a comparison of different video quality evaluation methods.
Figure 4:
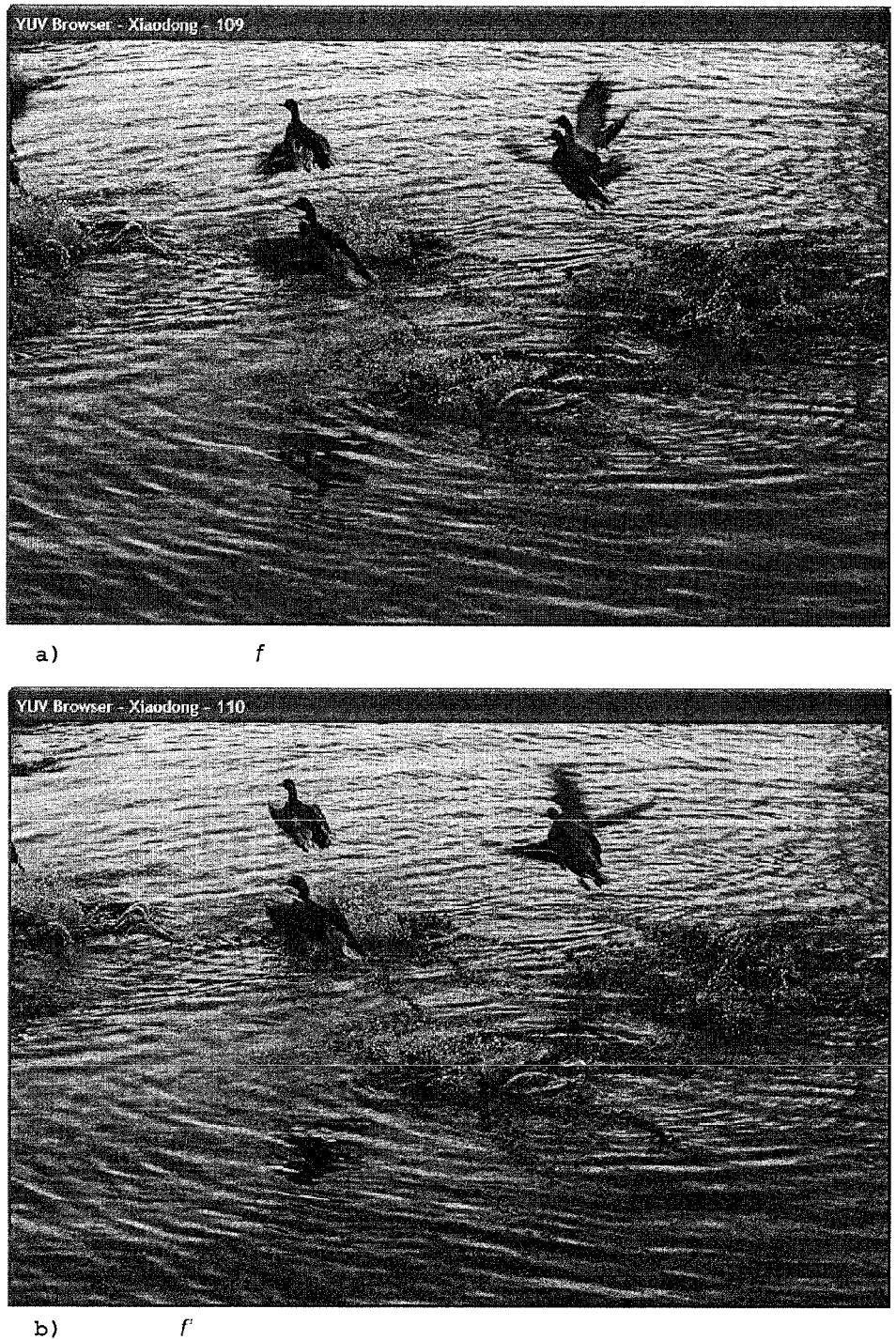
FIG. 4 frames and similarity maps.
Figure 4:
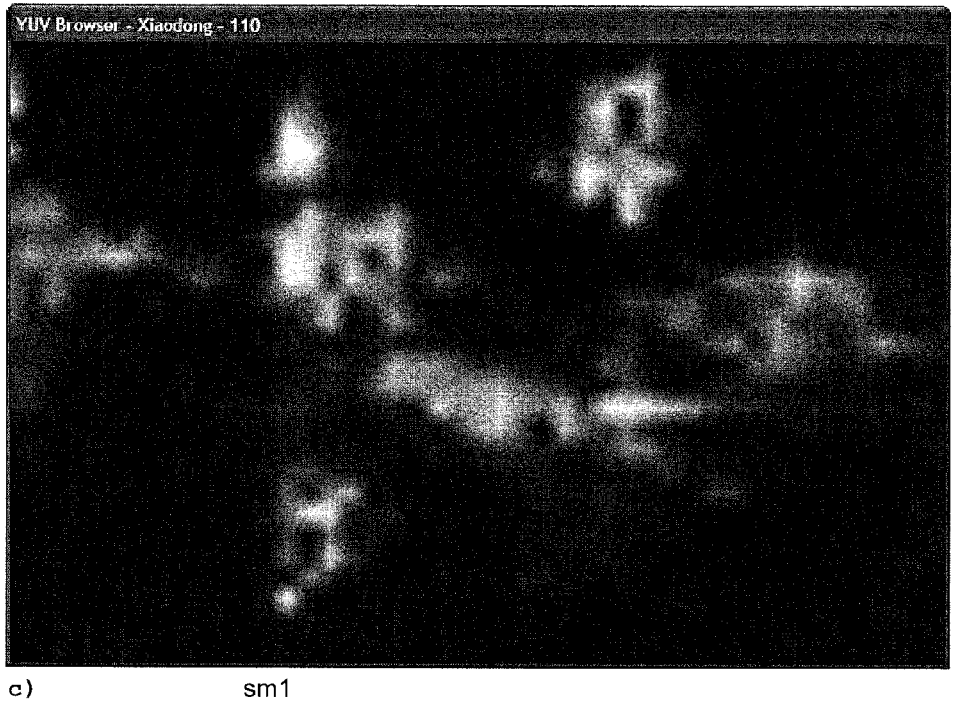
Figure 4:
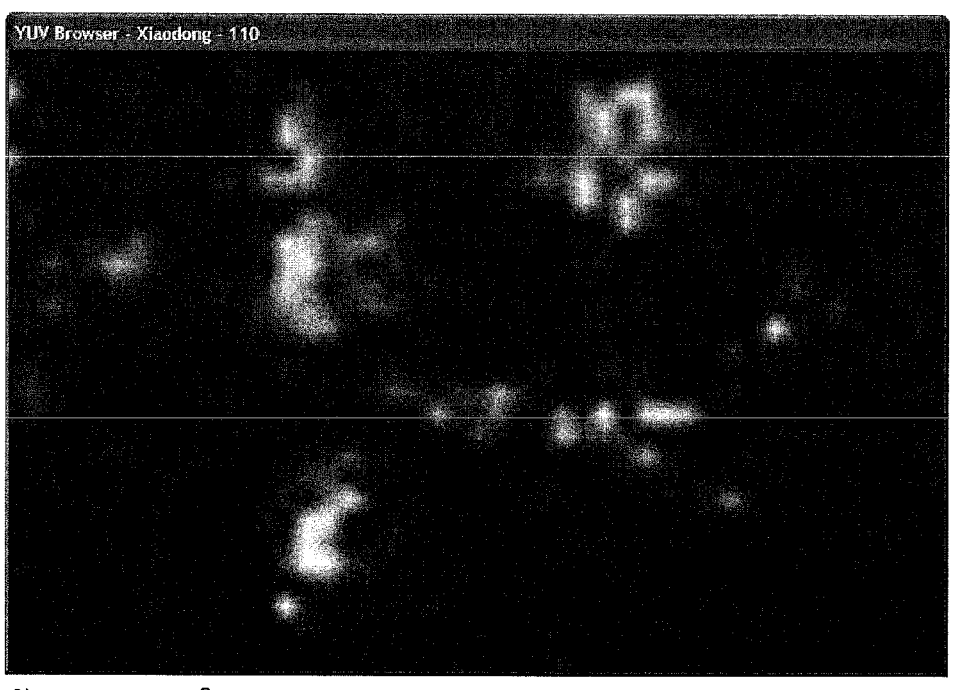

In the evaluation, we first choose a sample from the database to check the estimation accuracy. The chosen as a sample the sequence "DucksTakeOff", degraded with lowest bitrates. Some frames of the sample are shown in FIG. 4. FIG. 2 depicts the objective measurement for the sample video sequence. In FIG. 2, the line marked by x35 depicts the measurement of the method according to the invention. The other two lines depict the measurements of other methods PSNR and SSIM respectively. Judging from this chart, the performances of PSNR and SSIM are quite similar for the sample sequence, while the proposed method is quite different from both PSNR and SSIM.

Figure 3:
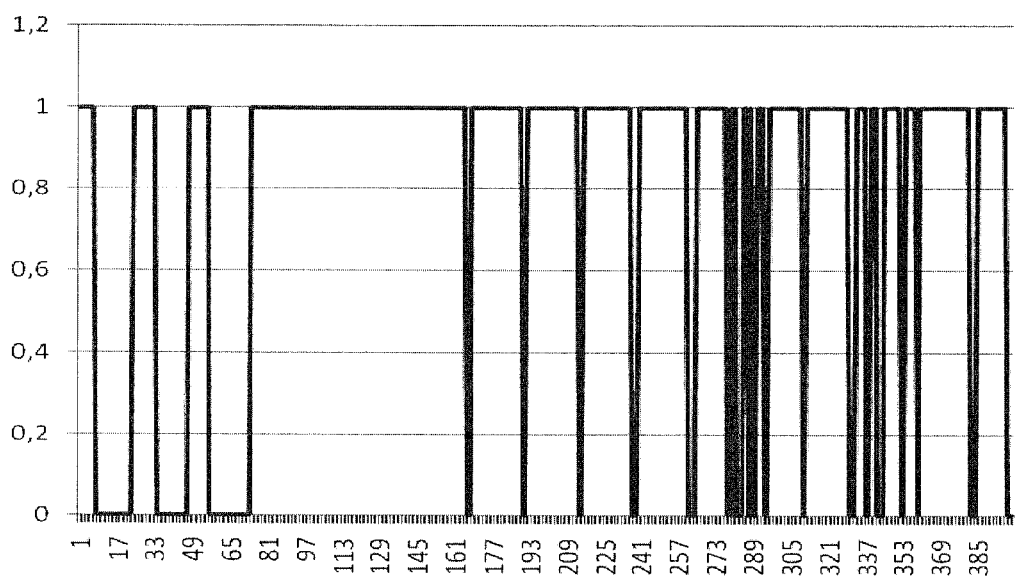
FIG. 3 subjective marks in an experiment using "DucksTakeOff" sequence.

We classify the sample video sequence into three subsections: section 1 (frames 0-75); section 2 (frames 76-140)

and section 3 (frames 141 to the end of the sequence). From FIG. 2 it is visible that the spatial quality of the frames in section 2 and section 3 are quite similar (according to PSNR and SSIM curves in the chart). However, the quality decrease caused by temporal variation is quite different. In section 3, the viewer can easier find spatial locations with quality flashes, which means switching between good and bad quality. In section 2 the video sequence is quite smooth and quality flashes are almost imperceptible. FIG. 3 shows subjective marks of viewers. Mark "1" means the sequence is quite smooth in the considered position, and mark "0" means that clear quality flashes can be observed. It can be seen that in the sample sequence the proposed method gives a very accurate estimation of quality decrease as caused by temporal variation, while PSNR and SSIM cannot. As described, above a simple subtraction of the spatial quality DeltaPSNR, DeltaSSIM for the neighbouring frames can not accurately estimate the quality decrease caused by temporal variation either, for reasons already analyzed above.

Figure 5:
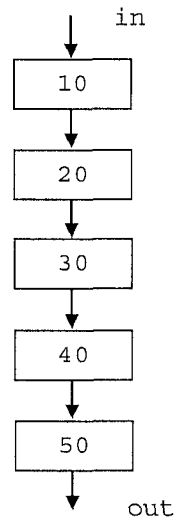
FIG. 5 a flow chart of the method for measuring video quality of a sequence of distorted video pictures.

In FIG. 4a)-d), a picture f, a temporal neighbouring picture f' and the corresponding similarity map of f,f' is shown. Additionally, the similarity map of $f_0$ is shown in d). While the similarity maps are shown as 2-dimensional picture, they may also be implemented as a sequence of values, a table etc. FIG. 5 shows an embodiment of a method for measuring video quality of a sequence of distorted video pictures, wherein the respective video pictures are also available as undistorted video pictures.

The method comprises steps of dividing 10 the pictures into blocks of equal size, generating 20 a first similarity map, wherein the blocks of a distorted picture f and the corresponding collocated blocks of a temporally neighbouring distorted picture f' are input to a first similarity function $f_{sim,1}(f,f') = \overrightarrow{CM}(f,f')$ that outputs a first similarity map, generating 30 a second similarity map, wherein the blocks of an undistorted picture $f_0$ and the corresponding collocated blocks of a temporally neighbouring undistorted picture $f'_0$ are input to the first similarity function $f_{sim,1}(f_0,f'_0)$ $\overrightarrow{CM}(f_0,f'_0)$ that outputs a second similarity map, and calculating 40 the similarity between the first similarity map and the second similarity map, wherein a second similarity function $f_{sim,2}(X,Y)$ is used according to $VQM_{variation} = f_{sim}^2(\overrightarrow{CM}(f,f'),\overrightarrow{CM}(f_0,f'_0))$ and wherein a single numerical value is obtained. Additionally, a step of providing 50 said single numerical value as a measure for the video quality of said sequence of distorted video pictures can be appended.

In one embodiment, the first similarity function performs a Pearson Correlation according to $$f_{sim}^1(X,Y) = PearsonCorrelation(X,Y)$$
$$= \frac{\sum_{i=1}^{n}(x_i - \overline{X})(y_i - \overline{Y})}{(n-1)\sigma_X \sigma_Y},$$

with x and y being pixel signals, $\overline{X}$ and $\overline{Y}$ being the average of the pixel signals, and $\sigma_X, \sigma_Y$ being the standard deviation of the pixel signals. In one embodiment, the first and the second similarity functions are different from each other.

In one embodiment, the second similarity function performs a calculation according to $$f_{sim}^2(X,Y) = \frac{\sum_{i=1}^{n}|x_i - y_i|}{n}.$$

In one embodiment, all blocks of the video pictures have equal size. In one embodiment, the measurement is performed only on a portion of a picture.

Figure 6:
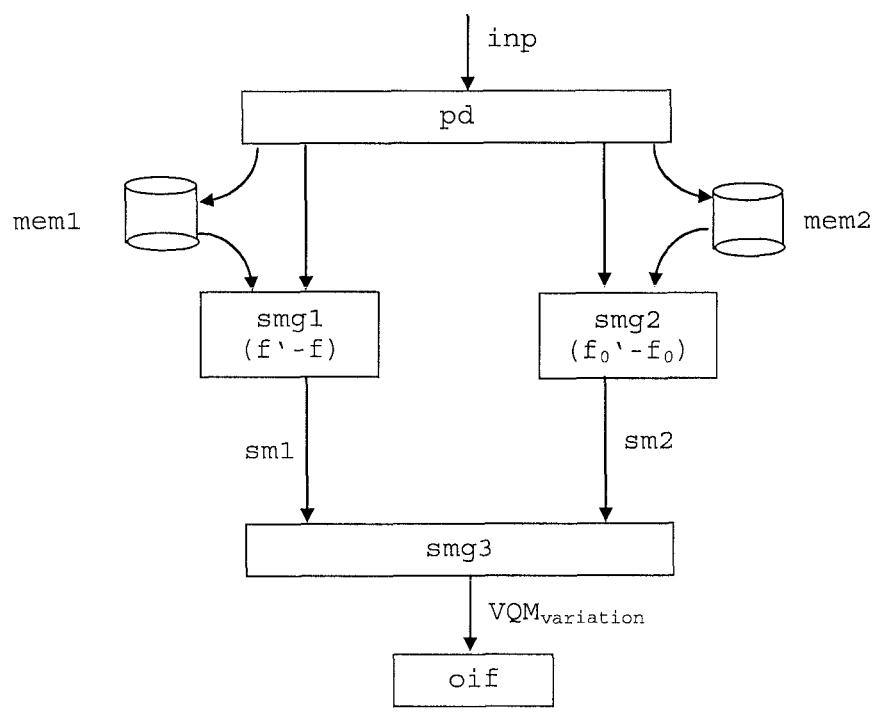
FIG. 6 a block diagram of a device for measuring video quality of a sequence of distorted video pictures.

FIG. 6 shows an embodiment of an apparatus for measuring video quality of a sequence of distorted video pictures, wherein the respective video pictures are also available as undistorted video pictures. The apparatus comprises picture dividing means pd for dividing the pictures into blocks of equal size, first similarity map generating means smg1 for generating a first similarity map sm1, wherein the blocks of a distorted picture f and the corresponding collocated blocks of a temporally neighbouring distorted picture f' are input to a first similarity function $f_{sim,1}(f,f') = \overrightarrow{CM}(f,f')$ that outputs a first similarity map, second similarity map generating means smg2 for generating a second similarity map sm2, wherein the blocks of an undistorted picture $f_0$ and the corresponding collocated blocks of a temporally neighbouring undistorted picture $f'_0$ are input to the first similarity function $f_{sim,1}(f,f_0) = \overrightarrow{CM}(f_0,f'_0)$ that outputs a second similarity map, third similarity map generating means smg3 for calculating a similarity between the first similarity map and the second similarity map, wherein a second similarity function $f_{sim,2}(X,Y)$ is used according to $VQM_{variation} = f_{sim}^2(\overrightarrow{CM}(f,f'),\overrightarrow{CM}(f_0,f'_0))$, and wherein a single numerical value $VQM_{variation}$ is obtained. Additionally, the apparatus may optionally contain output means oif for providing said single numerical value as a measure for the video quality of said sequence of distorted video pictures.

In one embodiment, the first similarity function performs a Pearson Correlation according to $$f_{sim}^1(X,Y) = PearsonCorrelation(X,Y)$$
$$= \frac{\sum_{i=1}^{n}(x_i - \overline{X})(y_i - \overline{Y})}{(n-1)\sigma_X \sigma_Y},$$

with x and y being pixel signals, $\overline{X}$ and $\overline{Y}$ being the average of the pixel signals, and $\sigma_X$ and $\sigma_Y$ being the standard deviation of the pixel signals.

In one embodiment, the first and the second similarity map generating means smg1,smg2 perform the same function, and both perform a different function than the third similarity map generating means smg3.

In one embodiment, the second similarity function performs a calculation according to $$f_{sim}^2(X,Y) = \frac{\sum_{i=1}^{n}|x_i - y_i|}{n}.$$

In one embodiment, all blocks of the picture have equal size. In one embodiment, the measurement is performed only on a portion of a picture.

In one embodiment, an improved method for estimating perceived video quality comprises steps of calculating smg1 a first similarity map sm1 between adjacent frames of a current sequence, calculating smg2 a second similarity map sm2 between the corresponding reference frames, and calculating smg3 a third similarity map, which provides a numerical quality value $VQM_{variation}$.

It should be noted that although similarity map generating means smg1, smg2 are shown as two distinct means, they may be implemented as a single means. They may also be two distinct means in distinct locations, with the second similarity measure sm2 being included in the video data stream. In this case, there may be two distinct picture dividing means pd required, one for distorted frames and one for undistorted frames, which may also be in different locations.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to measuring video quality, one skilled in the art would recognize that the method and devices described herein may be applied to any video quality improvement method that measures video quality, or for evaluating the performance of rate-control schemes when spatial quality variation is introduced by these schemes, or others. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

The invention claimed is:

1. A method for measuring video quality of a sequence of distorted video pictures, wherein the respective video pictures are also available as undistorted video pictures, comprising steps of dividing the pictures into blocks of equal size;

generating a first similarity map, wherein the blocks of a distorted picture f and the corresponding collocated blocks of a temporally neighboring distorted picture f' are input to a first similarity function $f_{sim,1}(f,f')=\overrightarrow{CM}(f,f')$ that outputs a first similarity map;

generating a second similarity map, wherein the blocks of an undistorted picture $f_0$ and the corresponding collocated blocks of a temporally neighboring undistorted picture $f'_0$ are input to the first similarity function $f_{sim,1}(f_0,f'_0)=\overrightarrow{CM}(f_0,f'_0)$ that outputs a second similarity map;

calculating the similarity between the first similarity map and the second similarity map, wherein a second similarity function $f_{sim,2}(X,Y)$ is used according to $VQM_{variation}=f_{sim}^2(\overrightarrow{CM}(f,f'),\overrightarrow{CM}(f_0,f'_0))$ and wherein a single numerical value is obtained, and wherein the second similarity function performs a calculation according to $$f_{sim}^2(X,Y) = \frac{\sum_{i=1}^{n} |x_i - y_i|}{n};$$

and providing said single numerical value as a measure for the video quality of said sequence of distorted video pictures.

2. Method according to claim 1, wherein the first similarity function performs a Pearson Correlation according to $$f_{sim}^1(X,Y) = PearsonCorrelation(X,Y)$$
$$= \frac{\sum_{i=1}^{n}(x_i - \overline{X})(y_i - \overline{Y})}{(n-1)\sigma_X\sigma_Y},$$

with x and y being pixel signals, $\overline{X}$ and $\overline{Y}$ being the average of the pixel signals, and $\sigma_x$ and $\sigma_y$ being the standard deviation of the pixel signals.

3. Method according to claim 1, wherein the first and the second similarity functions are different from each other.

4. Method according to claim 1, wherein all blocks have equal size.

5. Method according to claim 1, wherein the measurement is performed only on a portion of a picture.

6. An apparatus for measuring video quality of a sequence of distorted video pictures, wherein the respective video pictures are also available as undistorted video pictures, comprising picture dividing unit for dividing the pictures into blocks of equal size;

first similarity map generating unit for generating a first similarity map, wherein the blocks of a distorted picture f and the corresponding collocated blocks of a temporally neighboring distorted picture f' are input to a first similarity function $f_{sim,1}(f,f')=\overrightarrow{CM}(f,f')$ that outputs a first similarity map;

second similarity map generating unit for generating a second similarity map, wherein the blocks of an undistorted picture $f_0$ and the corresponding collocated blocks of a temporally neighboring undistorted picture $f'_0$ are input to the first similarity function $f_{sim,1}(f_0,f'_0)=\overrightarrow{CM}(f_0,f'_0)$ that outputs a second similarity map;

third similarity map generating unit (smg3) for calculating a similarity between the first similarity map and the second similarity map, wherein a second similarity function $f_{sim,2}(X,Y)$ is used according to $VQM_{variation}=f_{sim}^2(\overrightarrow{CM}(f,f'),\overrightarrow{CM}(f_0,f'_0))$, and wherein a single numerical value (VQM) is obtained, and wherein the second similarity function performs a calculation according to $$f_{sim}^2(X, Y) = \frac{\sum_{i=1}^{n} |x_i - y_i|}{n};$$

and
output unit for providing said single numerical value as a measure for the video quality of said sequence of distorted video pictures.

7. Apparatus according to claim 6, wherein the first similarity function performs a Pearson Correlation according to $$f_{sim}^1(X, Y) = PearsonCorrelation(X, Y)$$
$$= \frac{\sum_{i=1}^{n} (x_i - \overline{X})(y_i - \overline{Y})}{(n-1)\sigma_X \sigma_Y},$$

with x and y being pixel signals, $\overline{X}$ and $\overline{Y}$ being the average of the pixel signals, and $\sigma_x$ and $\sigma_y$ being the standard deviation of the pixel signals.

8. Apparatus according to claim 6, wherein the first and the second similarity map generating units perform the same function, and both perform a different function than the third similarity map generating unit.

9. Apparatus according to claim 6, wherein all blocks of the picture have equal size.

10. Apparatus according to claim 6, wherein the measurement is performed only on a portion of a picture.

11. A non-transitory computer readable storage medium having stored thereon computer executable instructions that when executed by a computer causes the computer to perform a method for measuring video quality of a sequence of distorted video pictures, wherein the respective video pictures are also available as undistorted video pictures, the method comprising the computer executed steps of
  dividing the pictures into blocks of equal size;
  generating a first similarity map, wherein the blocks of a distorted picture f and the corresponding collocated blocks of a temporally neighboring distorted picture f' are input to a first similarity function $f_{sim,1}(f,f')=\overrightarrow{CM}(f,f')$ that outputs a first similarity map;
  generating a second similarity map, wherein the blocks of an undistorted picture $f_0$ and the corresponding collocated blocks of a temporally neighboring undistorted picture $f'_0$ are input to the first similarity function $f_{sim,1}(f_0,f'_0)=\overrightarrow{CM}(f_0,f'_0)$ that outputs a second similarity map;
  calculating the similarity between the first similarity map and the second similarity map, wherein a second similarity function $f_{sim,2}(X,Y)$ is used according to $VQM_{variation}=f_{sim}^2(\overrightarrow{CM}(f,f'), \overrightarrow{CM}(f_0,f'_0))$ and wherein a single numerical value is obtained, and wherein the second similarity function performs a calculation according to $$f_{sim}^2(X, Y) = \frac{\sum_{i=1}^{n} |x_i - y_i|}{n};$$

and
  providing said single numerical value as a measure for the video quality of said sequence of distorted video pictures.

* * * * *